(12) United States Patent
Nitta et al.

(10) Patent No.: US 12,734,931 B2
(45) Date of Patent: Sep. 15, 2026

(54) BATTERY SYSTEM

(71) Applicant: TOYOTA JIDOSHA KABUSHIKI KAISHA, Aichi-ken (JP)

(72) Inventors: Iwao Nitta, Nagoya (JP); Yasuhide Kurimoto, Kasugai (JP); Kenji Zaitsu, Nisshin (JP); Sotaro Hayashi, Okazaki (JP); Ryota Suzuki, Ikeda (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 17 days.

(21) Appl. No.: 18/889,375

(22) Filed: Sep. 19, 2024

(65) Prior Publication Data

US 2025/0115155 A1 Apr. 10, 2025

(30) Foreign Application Priority Data

Oct. 4, 2023 (JP) ................................ 2023-173224
Mar. 26, 2024 (JP) ................................ 2024-050095

(51) Int. Cl.
*B60L 58/10* (2019.01)
*G06F 21/60* (2013.01)

(52) U.S. Cl.
CPC .............. *B60L 58/10* (2019.02); *G06F 21/60* (2013.01)

(58) Field of Classification Search
CPC ........... B60L 58/10; G06F 21/60; Y02T 10/70
USPC ................................................ 307/9.1, 10.1
See application file for complete search history.

(56) References Cited

U.S. PATENT DOCUMENTS

2007/0108946 A1 5/2007 Yamauchi et al.
2014/0277844 A1* 9/2014 Luke .................... B60L 53/305 701/123
2021/0192645 A1* 6/2021 Kawamura ........... G06Q 50/06
2022/0169144 A1* 6/2022 Kai ........................ B60L 53/53
2023/0011596 A1* 1/2023 Kato ...................... B60L 53/53
2025/0187485 A1* 6/2025 Ichikawa ............... B60L 53/68

FOREIGN PATENT DOCUMENTS

JP 2007-141464 A 6/2007

* cited by examiner

*Primary Examiner* — Elim Ortiz
(74) *Attorney, Agent, or Firm* — HAUPTMAN HAM, LLP

(57) ABSTRACT

In a battery system including a battery, a storage unit, and a control unit, the storage unit stores a first battery identifier associated with personal information in another system and a second battery identifier not associated with personal information in the other system, and the control unit selectively transmits either the first battery identifier or the second battery identifier to a predetermined information processing device together with battery information related to a status of the battery.

9 Claims, 5 Drawing Sheets

COLLECTING BATTERY INFORMATION USING A BATTERY IDENTIFIER ASSOCIATED WITH A VEHICLE

INFORMATION ON VEHICLE
BATTERY INFORMATION

FIRST SERVER 100

VEHICLE 300 BATTERY PACK 500

REMOVE FROM VEHICLES FOR RECYCLING

COLLECTING BATTERY INFORMATION USING A BATTERY IDENTIFIER THAT IS NOT ASSOCIATED WITH A VEHICLE

BATTERY INFORMATION

SECOND SERVER 200

COMMUNICATION DEVICE 400 BATTERY PACK 500

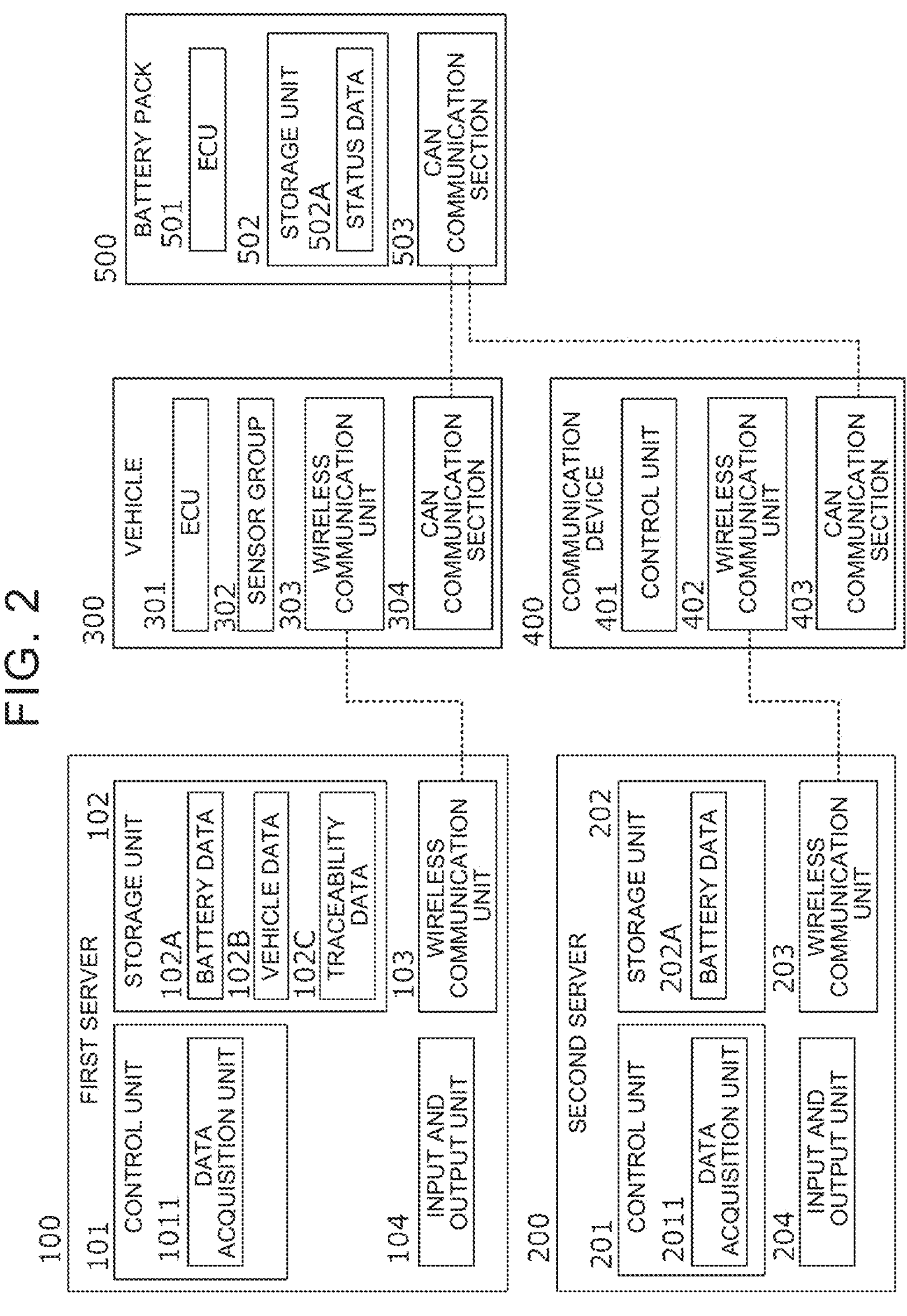
FIG. 2
100
FIRST SERVER
101
CONTROL UNIT
1011
DATA ACQUISITION UNIT
102
STORAGE UNIT
102A
BATTERY DATA
102B
VEHICLE DATA
102C
TRACEABILITY DATA
103
WIRELESS COMMUNICATION UNIT
104
INPUT AND OUTPUT UNIT
200
SECOND SERVER
201
CONTROL UNIT
2011
DATA ACQUISITION UNIT
202
STORAGE UNIT
202A
BATTERY DATA
203
WIRELESS COMMUNICATION UNIT
204
INPUT AND OUTPUT UNIT
300
VEHICLE
301
ECU
302
SENSOR GROUP
303
WIRELESS COMMUNICATION UNIT
304
CAN COMMUNICATION SECTION
400
COMMUNICATION DEVICE
401
CONTROL UNIT
402
WIRELESS COMMUNICATION UNIT
403
CAN COMMUNICATION SECTION
500
BATTERY PACK
501
ECU
502
STORAGE UNIT
502A
STATUS DATA
503
CAN COMMUNICATION SECTION

FIG. 3A

BATTERY DATA 102A

| | | |
|---|---|---|
| FIRST BATTERY ID | | … |
| BATTERY MODEL ID | | … |
| STATUS | CYCLE NUMBER | … |
| | SoH | … |
| | MAXIMUM OUTPUT | … |
| | MILEAGE | … |
| | … | … |
| … | | … |

FIG. 3B

VEHICLE DATA 102B

| | |
|---|---|
| VEHICLE ID | … |
| FIRST BATTERY ID | … |
| TRAVEL INFORMATION | … |
| … | … |

FIG. 3C

TRACEABILITY DATA 102C

| | |
|---|---|
| FIRST BATTERY ID | … |
| TRACEABILITY-RELATED INFORMATION | … |
| … | … |

FIG. 3D

BATTERY DATA 202A

| | | |
|---|---|---|
| SECOND BATTERY ID | | … |
| BATTERY MODEL ID | | … |
| STATUS | CYCLE NUMBER | … |
| | SoH | … |
| | MAXIMUM OUTPUT | … |
| | MILEAGE | … |
| | … | … |
| … | | … |

FIG. 3E

STATUS DATA 502A

| | | |
|---|---|---|
| FIRST BATTERY ID | | … |
| SECOND BATTERY ID | | … |
| BATTERY MODEL ID | | … |
| STATUS | CYCLE NUMBER | … |
| | SoH | … |
| | MAXIMUM OUTPUT | … |
| | MILEAGE | … |
| | … | … |
| … | … | … |

BATTERY INFORMATION

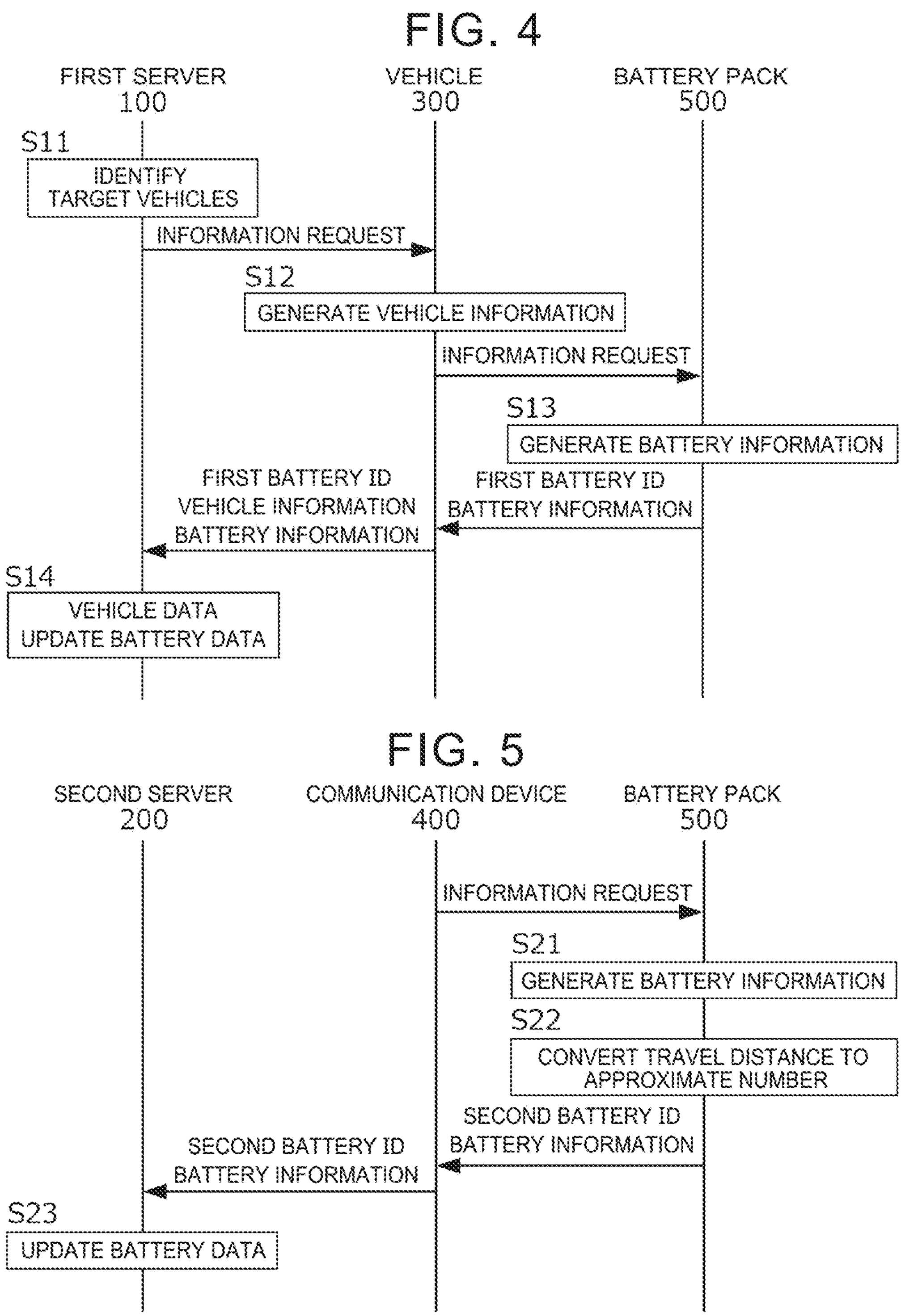
FIG. 4
FIRST SERVER
100
VEHICLE
300
BATTERY PACK
500
S11
IDENTIFY TARGET VEHICLES
INFORMATION REQUEST
S12
GENERATE VEHICLE INFORMATION
INFORMATION REQUEST
S13
GENERATE BATTERY INFORMATION
FIRST BATTERY ID
VEHICLE INFORMATION
BATTERY INFORMATION
FIRST BATTERY ID
BATTERY INFORMATION
S14
VEHICLE DATA
UPDATE BATTERY DATA
FIG. 5
SECOND SERVER
200
COMMUNICATION DEVICE
400
BATTERY PACK
500
INFORMATION REQUEST
S21
GENERATE BATTERY INFORMATION
S22
CONVERT TRAVEL DISTANCE TO APPROXIMATE NUMBER
SECOND BATTERY ID
BATTERY INFORMATION
SECOND BATTERY ID
BATTERY INFORMATION
S23
UPDATE BATTERY DATA

BATTERY SYSTEM

CROSS-REFERENCE TO RELATED APPLICATION

This application claims priority to Japanese Patent Application No. 2023-173224 filed on Oct. 4, 2023 and Japanese Patent Application No. 2024-050095 filed on Mar. 26, 2024, each incorporated herein by reference in its entirety.

BACKGROUND

1. Technical Field

The present disclosure relates to a battery system.

2. Description of Related Art

A system for managing a battery of a battery electric vehicle has been conceived. As a disclosure related therewith, for example, Japanese Unexamined Patent Application Publication No. 2007-141464 (JP 2007-141464 A) discloses a battery information management system that collects and manages characteristics, usage history, and so forth, of an onboard battery.

SUMMARY

An object of the present disclosure is to appropriately protect privacy in management of battery information.

A first aspect of the present disclosure is a battery system, comprising: a battery;

- a storage unit that stores a first battery identifier associated with personal information in another system, and a second battery identifier not associated with personal information in the other system, and
- a control unit that selectively transmits one of the first battery identifier and the second battery identifier, together with battery information related to a status of the battery, to a predetermined information processing device.

Another aspect of the present disclosure is a device included in the system, an information processing method executed by the device, a program for causing a computer to execute the information processing method, or a computer-readable storage medium storing the program in a non-transitory manner.

According to the present disclosure, privacy can be appropriately protected in the management of battery information.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating a configuration of a plurality of devices included in a system;

FIG. 3A is a diagram illustrating data store in a plurality of devices included in a system;

FIG. 3B is a diagram illustrating data stored in a plurality of devices included in a system;

FIG. 3C is a diagram illustrating data stored in a plurality of devices included in a system;

FIG. 3D is a diagram illustrating data stored in a plurality of devices included in a system;

FIG. 3E is a diagram illustrating data stored in a plurality of devices included in a system;

FIG. 4 is a sequence diagram of a process in which the first server acquires information;

FIG. 5 is a sequence diagram of a process in which a second server acquires data.

DETAILED DESCRIPTION OF EMBODIMENTS

Figure 1:
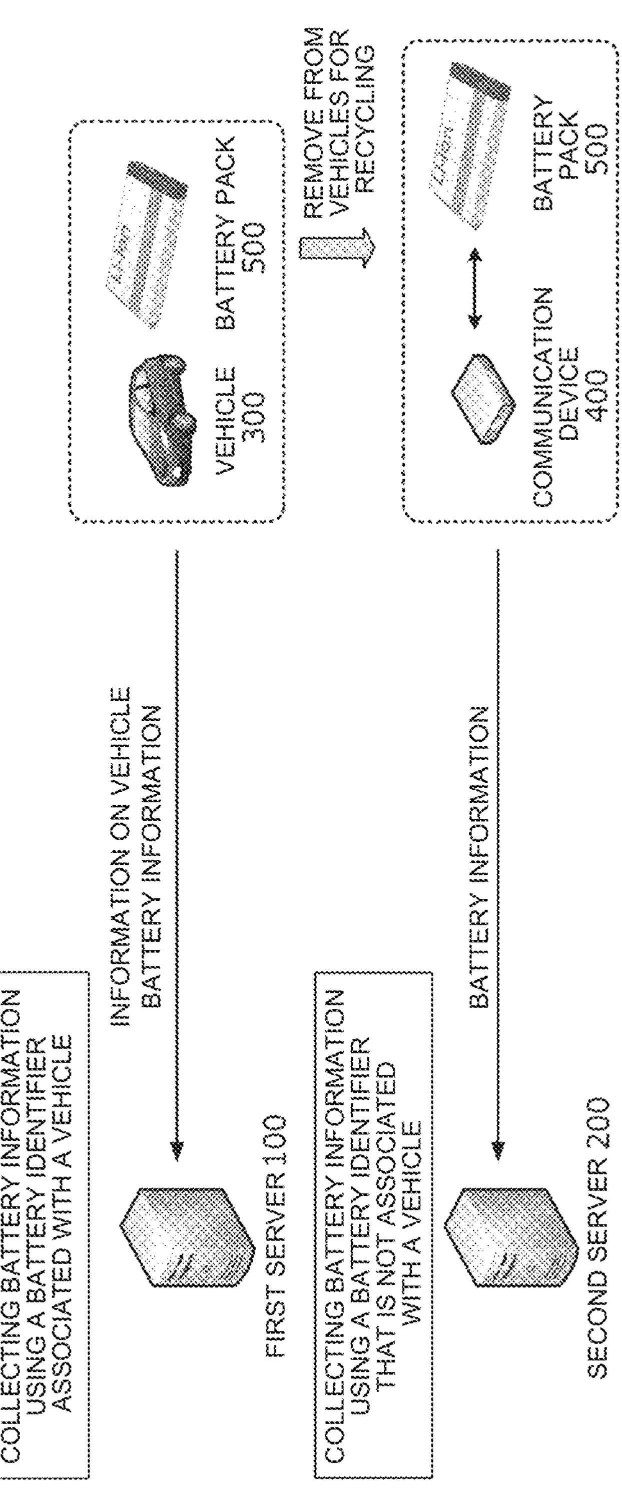
FIG. 1 is a diagram for explaining an outline of a battery management system according to a first embodiment.

In recent years, an increasing number of vehicles have been equipped with a driving battery such as battery electric vehicle (BEV), plug-in hybrid electric vehicle (PHEV), and the like, and are capable of traveling using electricity as an energy source. In addition, a system is known in which information (battery information) relating to the status of a battery mounted on a vehicle is collected by an automobile manufacturer or the like and collectively managed.

In such systems, battery information is managed in association with a particular vehicle. In addition, when the travel history of the vehicle is managed by the same system, private information such as a travel history can be traced from the battery information. For this reason, prior to collecting battery information, it is common practice to obtain prior consent regarding the handling of personal information from an owner of a vehicle or the like.

However, when the battery information is collected in such a manner that the personal information is linked, the personal information becomes a restriction, and there may be a case where the battery information cannot be utilized.

For example, consider a case where a battery mounted on an automobile is removed from the automobile for recycling purposes. In order to evaluate the value of the battery, it is necessary to use the battery information acquired from the battery. However, the identifier (serial number or the like) of the battery is associated with the personal information of the previous owner in the system of the automobile manufacturer. That is, even after the battery is removed from the vehicle, it is possible to follow the previous owner. This is not preferable from the viewpoint of personal information protection.

The battery system according to the present disclosure solves such a problem.

A battery system according to a first aspect of the present disclosure includes a battery, a storage unit, and a control unit.

Specifically, the storage unit stores a first battery identifier associated with the personal information in the other system and a second battery identifier not associated with the personal information in the other system. The control unit selectively transmits, to the predetermined information processing device, one of the first battery identifier and the second battery identifier together with battery information related to the status of the battery.

The battery system according to the present disclosure stores a plurality of identifiers as identifiers for identifying the batteries. The first battery identifier is associated with personal information in another system among these identifiers. For example, the first battery identifier is associated with a specific vehicle or an owner of the vehicle in a battery management device managed by an automobile manufacturer. In other words, it can be said that the battery information associated with the first battery identifier is associated with personal information. For example, when transmitting battery information to such a device, the control unit transmits the first battery identifier and the battery information in combination.

The second battery identifier is not associated with the personal information in another system among the identifiers for identifying the battery. For example, in a device that manages a battery removed from a vehicle, it is not necessary to associate the vehicle with the battery. For example, when transmitting the battery information to such a device, the control unit transmits the second battery identifier and the battery information that are not associated with the personal information in combination. The personal information cannot be traced from the battery information collected using the second battery identifier.

The storage unit included in the battery system according to the present disclosure stores both the first battery identifier and the second battery identifier. The control unit selectively determines an identifier to be transmitted according to a partner who provides the battery information. For example, if the battery is mounted on a vehicle, the battery information may be transmitted with the first battery identifier, and if the battery is removed from the vehicle, the battery information may be transmitted with the second battery identifier.

According to this configuration, it is possible to appropriately separate the information in the case where the battery information is handled together with the personal information and in the other cases.

As described above, when the battery identifier associated with the personal information and the battery information are combined, the personal information can be traced from the battery identifier even in a case where the personal information is not handled. On the other hand, in the battery system according to the present disclosure, such a case can be prevented.

Note that the battery information may include travel distance information of a vehicle associated with the battery (specifically, a vehicle on which the battery is mounted or is mounted). In such a case, the vehicle on which the battery is mounted may be narrowed down by referring to the traveling distance value. Therefore, when transmitting the second battery identifier to the predetermined information processing device, the control unit may convert the value indicated by the travel distance information included in the battery information into an approximate number. For example, such problems can be prevented by truncating the mileage to a particular digit or rounding it to a rough number.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

An outline of the battery management system according to the first embodiment will be described with reference to FIG. 1. The battery management system according to the present embodiment is a system in which information (battery information) about a battery pack 500 designed for the vehicle 300 is managed by a server device. The battery pack 500 is a unit in which a control computer (ECU) or the like is added to a driving battery of the vehicle. In the description of the embodiment, the battery pack is also simply referred to as a battery. The battery pack can also be removed from the original vehicle and reused for applications such as, for example, household storage batteries.

The battery management system according to the present embodiment includes a first server 100 and a second server 200 as server devices. The first server 100 is a server device that communicates with the vehicle 300 to collect information on the vehicle 300 and information on the battery pack 500 mounted on the vehicle 300. The first server 100 may be a management device operated by an automobile manufacturer that manufactures the vehicle 300.

The first server 100 manages the battery information of the battery pack 500 in association with the vehicle 300. For example, the first server 100 collects the identifier, the position information, the speed, the travel distance, and the like of the vehicle 300 as the information on the vehicle, and stores the information on the battery pack 500 in association therewith. Thus, the first server 100 can grasp the latest state of the vehicle 300 and the battery pack 500. The first server 100 may acquire, in advance, an agreement to collect such information from the owner of the vehicle 300.

As illustrated in the upper diagram of FIG. 1, when the battery pack 500 is mounted on the vehicle 300, the first server 100 can collect information about the battery pack 500 via the vehicle 300. The first server 100 stores, for example, an identifier of the battery pack 500 (hereinafter, referred to as a battery identifier), an identifier of the vehicle 300, and the collected information in association with each other.

On the other hand, the battery pack 500 can be removed from the vehicle 300 and recycled. For example, the removed battery pack 500 may be attached to another vehicle to be redistributed, or the removed battery pack 500 may be incorporated into a device other than the vehicle (such as a household storage battery) to be redistributed.

However, when the battery pack 500 is removed from the vehicle 300, it becomes difficult to use the battery information collected by the first server 100 after the removal. This is because the battery information collected by the first server 100 is associated with the vehicle 300 (further, the original owner of the vehicle 300), and therefore it is not appropriate to use such information after the battery is separated from the vehicle. For example, the first server 100 has obtained an agreement regarding information acquisition from the owner of the vehicle 300 in advance, but in most cases has not obtained an agreement regarding the use of the information after the battery is separated from the vehicle.

After the battery pack 500 is removed from the vehicle 300, the battery pack 500 and the computer may be connected to directly read the battery information. However, as long as the battery identifier stored in the battery pack 500 is associated with the vehicle in any device, there remains a risk that an individual can be identified. This is because the identifier of the vehicle 300 and the identifier of the battery pack 500 are associated with each other in the first server 100.

In order to solve this problem, it is necessary to collect battery information using a battery identifier that is not associated with a vehicle or an individual at all.

Therefore, in the present embodiment, two types of battery identifiers are given to the battery pack 500, and battery information is collected using different battery identifiers before and after being removed from the vehicle 300.

The lower diagram of FIG. 1 is a diagram illustrating information collection after the battery pack 500 is removed from the vehicle 300. The battery pack 500 removed from the vehicle 300 may communicate with the second server 200 via the communication device 400.

The second server 200 is a server device that manages purely only battery information, which does not hold information about the owner of the vehicle 300. After being removed from the vehicle 300, the battery pack 500 transmits the battery information to the second server 200 via the communication device 400. At this time, the battery pack 500 transmits the battery information together with the battery identifier that is not associated with the vehicle. The second server 200 cannot associate the battery with the individual even if the acquired information is used.

As described above, the battery pack 500 outputs the battery identifier (first battery identifier) associated with the vehicle under the situation in which the vehicle 300 is mounted. In addition, the battery pack 500 outputs a battery identifier (second battery identifier) that is not associated with the vehicle in a situation where the battery is removed from the vehicle 300. Accordingly, after the battery is removed from the vehicle, the battery information can be acquired and used without being restricted by the personal information.

FIG. 2 is a diagram illustrating components of the first server 100, the second server 200, the vehicle 300, the communication device 400, and the battery pack 500 included in the battery management system according to the present embodiment in more detail.

The first server 100 is a device operated by an automobile manufacturer that manufactures the vehicle 300. The first server 100 is a device that collects and manages information on the vehicle 300 (for example, position information and the like) and information on the battery pack 500. The information related to the battery pack 500 is, for example, information related to how the battery is used in the marketplace, such as a traveling distance of the vehicle, a temperature, a current, and a State Of Charge (SOC) of the battery, and a degradation state of the battery. The information collected by the first server 100 is linked with information related to the vehicle 300. Information collected from these markets may be associated with information about the owner of the vehicle 300 in the first server 100. The first server 100 collects and manages these pieces of information based on the consent obtained in advance from the owner of the vehicle 300.

The second server 200 is a device for acquiring information on the battery pack 500 removed from the vehicle 300, and is operated by a business operator not directly related to the automobile manufacturer. The second server 200 does not manage the information on the vehicle 300, and does not associate the acquired battery information with the vehicle on which the battery pack 500 has been mounted in the past or the information on the owner of the vehicle. It should be noted that the second server 200 may be operated by an automobile manufacturer that manufactures the vehicle 300, but in this case, it is completely independent of the first server 100 and is not associated with information about the owner of the vehicle 300 or the vehicle 300.

The vehicle 300 is an automobile (connected car) on which the battery pack 500 is mounted. The vehicle 300 includes a module for wireless communication (wireless communication unit 303), a module for CAN communication (CAN communication unit 304), and an Electronic Control Unit (ECU) 301. The first server 100 can acquire information from the battery pack 500 via these means. ECU 301 included in the vehicle 300 has a function of acquiring information (for example, position information and the like) related to the host vehicle and transmitting the information as vehicle information to the first servers 100.

The communication device 400 relays communication between the second server 200 and the battery pack 500. The battery pack 500 removed from the vehicle 300 loses an interface for wireless communication, and thus cannot communicate with the second server 200 as it is. Therefore, in the present embodiment, the communication device 400 relays communication between the second server 200 and the battery pack 500. The communication device 400 has an interface (for example, a CAN interface) similar to that of the vehicles 300, and can communicate with the battery pack 500 via the interface.

The battery pack 500 is a unit including a driving battery for driving the vehicle 300. In addition to being incorporated into the vehicle 300, the battery pack 500 can be removed from the vehicle 300, incorporated into another vehicle, and used by being incorporated into a device other than the vehicle (e.g., a household storage battery). The battery pack 500 includes a battery body such as a lithium-ion battery and a computer (ECU 501) for performing charge/discharge control. ECU 501 included in the battery pack 500 has a function of acquiring information on the status of the battery (battery information, for example, a value related to the degradation state of the battery) and outputting the information to the outside together with its own identifier.

Next, the details of each device will be described.

First, the first server 100 will be described.

The first server 100 is, for example, a computer such as a personal computer, a smartphone, a mobile phone, a tablet computer, or a personal information terminal. The first server 100 includes a control unit 101, a storage unit 102, a wireless communication unit 103, and an input/output unit 104.

The control unit 101 is an arithmetic unit that controls the control performed by the first server 100. The control unit 101 can be realized by an arithmetic processor such as a Central Processing Unit (CPU).

The control unit 101 communicates with the vehicle 300 to acquire two types of information, namely, information on the vehicle 300 (vehicle information) and information on the battery pack 500 (battery information).

The control unit 101 includes a data acquisition unit 1011 as a functional module. The functional module may be realized by executing the stored program by a CPU. The data acquisition unit 1011 acquires battery information of any vehicle by communicating with the battery pack 500 (ECU 501) via the vehicle 300. In addition, the data acquisition unit 1011 acquires the vehicle information of the vehicle by communicating with ECU 301 of the vehicle 300. The acquired battery data is stored in the storage unit 102 (described later) as battery data 102A. The acquired vehicle information is stored in the storage unit 102 as vehicle data 102B.

The storage unit 102 includes a main storage device and an auxiliary storage device. The main storage device is a memory in which a program executed by the control unit 101 and data used by the control program are expanded. The auxiliary storage device is a device in which a program executed by the control unit 101 and data used by the control program are stored. The auxiliary storage device may store a program executed by the control unit 101 such that the program is packaged as applications. Further, an operating system for executing these applications may also be stored. The program stored in the auxiliary storage device is loaded into the main storage device and executed by the control unit 101, so that the process described below will be performed.

The main storage device may include Random Access Memory (RAM) or Read Only Memory (ROM). The secondary storage device may include Erasable Programmable ROM (EPROM) or Hard Disk Drive (HDD). Further, the auxiliary storage device may include a removable medium, that is, a portable recording medium.

The storage unit 102 also stores battery data 102A, vehicle data 102B, and traceability data 102C.

The battery data 102A is a set of battery data acquired from the battery pack 500 mounted on the vehicles 300. FIG. 3A shows an exemplary battery data 102A. As shown in the figure, the battery data 102A includes fields of a first battery ID, a battery model ID, and a status. In the first battery ID field, an identifier for uniquely identifying the battery pack 500 is stored. The first servers 100 store the first battery ID and the identifiers of the vehicles 300 in association with each other. In other words, the first battery ID is a battery identifier associated with the vehicles 300 (and the owners thereof) in the first servers 100.

In the battery model ID field, an identifier for identifying a model of the battery pack 500 is stored.

The status field stores a set of data related to the status of the battery. Battery status data includes, for example, charge/discharge count, State of Health (SoH), power, and mileage. SoH represents a ratio of the present full charge capacity to the initial full charge capacity. For example, a battery with a SoH of 80% can store 80% of its original full charge capacity. The number of times of charging and discharging is the number of times of charging and discharging from a new product. The number of charges and discharges is counted as one at the time when the power of the battery is used by 100%. The maximum output is the maximum power that the battery can output. If the battery is degraded, the maximum power may be limited. That is, there are also used batteries that have a lower maximum output than a new one.

The travel distance is a value of an odometer included in the vehicle 300 on which the battery is mounted. The information is updated at any time based on travel distance information (such as an odometer or a value of a trip meter) acquired from the vehicle 300. In the case where the battery is replaced between vehicles, the travel distance may be a cumulative value of all vehicles.

Note that other indices may be used as long as they are indices indicating the degree of deterioration of the battery. For example, indicators such as an operation history of a safety device included in a battery and a state of a plurality of cells may be used.

The vehicle data 102B is a set of vehicle information acquired from the vehicle 300. FIG. 3B shows an exemplary vehicle-data 102B. As shown in the figure, the vehicle data 102B includes fields of a vehicle ID, a first battery ID, and travel information. In the vehicle ID field, an identifier for uniquely identifying the vehicle 300 is stored. As described above, the first battery ID field stores an identifier for uniquely identifying the battery pack 500 mounted on the vehicle 300. In the travel information field, a set of data related to travel of the vehicle 300 is stored. Examples of the traveling data include speed, traveling direction, and position information. The vehicle data 102B is updated by the vehicle information periodically collected from the vehicle 300.

An exemplary traceability data 102C is shown in FIG. 3C. The traceability data 102C is information (traceability-related information) for calculating, for the target battery pack 500, a score related to an emission of greenhouse gases, a recycle rate of raw materials, a due diligence, and the like at the time of manufacturing. The first servers 100 store the managed battery packs 500 in association with the first battery ID and the traceability-related data, and can provide them as required.

The wireless communication unit 103 is a wireless communication interface for connecting the first server 100 to a network. The wireless communication unit 103 is configured to be capable of wireless communication with the vehicles 300 via a communication service such as a wireless LAN, a 3G, 4G, or a 5G, for example.

The input/output unit 104 is a unit that receives an input operation performed by an operator of the device and presents information to the operator. In the present embodiment, a single touch panel display is used. That is, the device includes a liquid crystal display, a control unit thereof, a touch panel, and a control unit thereof.

Next, the second server 200 will be described.

The second server 200 is, for example, a computer such as a personal computer, a smartphone, a mobile phone, a tablet computer, or a personal information terminal. The second server 200 includes a control unit 201, a storage unit 202, a wireless communication unit 203, and an input/output unit 204.

The second servers 200 can be configured as computers having processors such as CPU and GPU, main storage devices such as RAM and ROM, and secondary storage devices such as EPROM, hard disk drives, and removable media. Since the configuration of the second server 200 can be the same as that of the first server 100, a detailed description of the hardware configuration will be omitted.

The control unit 201 is an arithmetic unit that controls the control performed by the second server 200. The control unit 201 can be realized by an arithmetic processor such as a Central Processing Unit (CPU).

The control unit 201 acquires information (battery information) related to the battery pack 500 via the communication device 400. The control unit 201 is different from the control unit 101 of the first server 100 in that it communicates with the battery pack 500 via the communication device 400 instead of the vehicle 300.

The control unit 201 includes a data acquisition unit 2011 as a functional module. The functional module may be realized by executing the stored program by a CPU. The data acquisition unit 2011 acquires the battery data by communicating with the battery pack 500 (ECU 501) via the communication device 400. The acquired battery data is stored as a battery data 202A, which will be described later.

Similarly to the storage unit 102, the storage unit 202 includes a main storage device and an auxiliary storage device. The storage unit 202 stores battery data 202A. The battery data 202A is a set of battery data acquired from the battery pack 500. FIG. 3D shows an exemplary battery data 202A. The battery data 202A is similar to the battery data 102A stored by the first server 100, but differs in that the battery pack 500 is identified by the second battery ID instead of the first battery ID. The second battery ID is an identifier for uniquely identifying the battery pack 500 like the first battery ID, but the identifier of the second battery ID and the identifier of the vehicles 300 are not associated with each other in either the first server 100 or the second server 200. In other words, the second battery ID is a battery identifier that cannot be associated with the vehicles 300 (and their owners).

In the present embodiment, the second servers 200 manage the battery data using the second battery ID. Since the second battery ID is not associated with the vehicle 300 and the owner thereof, the battery information can be used without restrictions on the personal information as long as the second battery ID is used.

Since the wireless communication unit 203 and the input/output unit 204 are the same as those of the wireless communication unit 103 and the input/output unit 104, description thereof will be omitted.

The vehicle 300 will be described hereinbelow.

The vehicles 300 are battery electric vehicle on which the battery pack 500 is mounted. The vehicle 300 is typically a Battery EV (BEV), but may be, for example, a plug-in hybrid electric vehicle or the like as long as it is a vehicle driven by a driving battery.

The vehicle 300 is wirelessly connected to the first server 100. Further, the vehicles 300 are communicably connected to the battery pack 500 via an in-vehicle network (CAN network).

The vehicle 300 includes an ECU 301, a sensor group 302, a wireless communication unit 303, and a CAN communication unit 304.

ECU 301 acquires vehicle information and battery information in response to a request from the first server 100, and transmits the vehicle information and the battery information to the first server 100. The vehicle information includes, for example, a vehicle speed, a traveling direction, position information, and the like of the vehicle 300, and can be generated based on sensor data acquired from the sensor group 302, which will be described later. The battery data can be acquired from ECU 501 of the battery pack 500.

The sensor group 302 is a set of a plurality of sensors for acquiring vehicle information. For example, the sensor group 302 may include a velocity sensor, a gyrosensor, a compass, a GPS module, and the like.

The wireless communication unit 303 is a wireless communication interface for connecting the vehicle 300 to a network. The wireless communication unit 303 is configured to be able to communicate with the first servers 100 via a mobile communication service such as a wireless LAN, a 3G, 4G, or a 5G, for example.

CAN communication unit 304 is a communication interface with an in-vehicle network provided in the vehicle 300. CAN communication unit 304 performs Controller Area Network (CAN) network-based communication.

Next, the communication device 400 will be described.

The communication device 400 is a device that connects the second server 200 and the battery pack 500. The battery pack 500 has only interfaces for communicating with the vehicles 300 via a CAN network. The battery pack cannot communicate with the second servers 200 by itself. Therefore, in the present embodiment, the second server 200 and the battery pack 500 are connected by using the communication device 400 having both CAN network interface and the radio communication interface. The communication device 400 has a CAN network interface similar to that of the vehicles 300, and can communicate with the battery pack 500 via the network interface.

The communication device 400 includes a control unit 401, a wireless communication unit 402, and a CAN communication unit 403.

In response to a request from the second server 200, the control unit 401 acquires battery information from ECU 501 of the battery pack 500 and transmits the information to the second server 200.

The wireless communication unit 402 is a network interface similar to the wireless communication unit 203 for connecting the communication device 400 to a network. CAN communication unit 403 is a communication interface with the in-vehicle network similar to CAN communication unit 304. CAN communication unit 403 performs communication via a CAN network.

Next, the battery pack 500 will be described.

The battery pack 500 is a unit in which a computer (ECU 501), a storage unit 502, and a CAN communication unit 503 for performing charge/discharge control of the battery are added to a battery body such as a lithium-ion battery.

In addition to the charge/discharge control of the battery main body, ECU 501 periodically generates battery information that is information about its own status, and causes the storage unit 502, which is a storage device, to store the battery information as status data 502A. ECU 501 transmits the stored battery data to the external device in response to a request from the external device.

FIG. 3E is an exemplary status-data 502A. The status data 502A is similar to the battery data 102A stored by the first server 100 and the battery data 202A stored by the second server 200. However, there is a difference in that both the first battery ID and the second battery ID are associated.

Further, when transmitting the battery data, ECU 501 determines which of the first battery ID and the second battery ID is to be outputted according to the destination. In the present embodiment, when the battery pack 500 is attached to the vehicle 300 and transmits the battery information to the first server 100 via the vehicle 300, ECU 501 transmits the first battery ID in association with the battery information. When the battery pack 500 is detached from the vehicle 300 and transmits the battery information to the second server 200 via the communication device 400, ECU 501 transmits the battery information in association with the second battery ID. At this time, ECU 501 executes a process of converting the travel distance included in the battery information into an approximate number.

CAN communication unit 503 is an interface for connecting the battery pack 500 to the in-vehicle network.

The configuration shown in FIG. 2 is an example, and all or a part of the functions shown in FIG. 2 may be executed using a specially designed circuit. Further, a program may be stored or executed by a combination of the main storage device and the auxiliary storage device other than the functions shown in FIG. 2.

Next, processing executed by each device included in the system will be described.

FIG. 4 is a sequence diagram of processing performed by the first server 100 to acquire information about the vehicle 300 and the battery pack 500 mounted on the vehicle 300. The illustrated processing is executed in a state where the battery pack 500 is mounted on the vehicle 300. The processing may be executed periodically or may be executed using a predetermined event as a trigger.

First, in S11, the first server 100 may determine the target vehicle that identifies the target vehicle for which the information is to be collected according to the collection schedule of the information, or may determine the target vehicle based on an instruction from an operator. For example, the first server 100 acquires the vehicle ID of the determined vehicle, and transmits the information-request to the vehicle 300 having the vehicle ID. The information request is data for requesting the vehicle 300 to transmit the vehicle information and the battery information. The information-request is received by the vehicle 300 (ECU 301).

In S12, the vehicle 300 (ECU 301) that has received the information request generates vehicle information. As described above, the vehicle information may include a speed, a traveling direction, position information, and the like of the vehicle. ECU 301 can acquire these data based on the sensor data acquired from the sensor group 302. In addition, ECU 301 transmits an information-request to the battery-pack 500 (ECU 501). The information request is data for requesting the battery pack 500 to transmit the battery information.

In S13, the battery pack 500 (ECU 501) that has received the information request generates battery information. ECU 501 may generate the battery information based on the status data 502A stored in the storage unit 502, or may update the status data 502A with the latest information and generate the battery information based on the updated information. A first battery ID is associated with the generated battery data. The first battery ID and the battery data are transmitted to the vehicle 300 (ECU 301).

The vehicle 300 (ECU 301) adds the vehicle information to the first battery ID and the battery information, and transmits the vehicle information to the first servers 100.

In S14, the first servers 100 update the battery data 102A and the vehicle data 102B based on the received data.

FIG. 5 is a sequence diagram of a process in which the second server 200 acquires information about the battery pack 500 removed from the vehicle 300. The illustrated process is performed in a state in which the battery pack 500 is detached from the vehicle 300 and is connected to the communication device 400. The process may be initiated by an operator operation.

First, the operator connects the communication device 400 and the battery pack 500. The communication device 400 and the battery pack 500 may be connected using CAN interfaces.

When the communication device 400 and the battery pack 500 are connected, the communication device 400 (the control unit 401) transmits an information-request to the battery pack 500 (ECU 501). The information request is data for requesting the battery pack 500 to transmit the battery information.

In S21, the battery pack 500 (ECU 501) that has received the information request generates battery information. ECU 501 may generate the battery information based on the status data 502A stored in the storage unit 502, or may update the status data 502A with the latest information and generate the battery information based on the updated information. A second battery ID is associated with the generated battery data.

As described above, the status data includes information on the travel distance of the vehicle 300 to which the battery pack 500 has been mounted. Although the second battery ID is a ID that is not associated with the vehicle, referring to the travel range, the vehicle on which the battery pack 500 is mounted may be narrowed down. Therefore, ECU 501 converts the travel distance included in the battery information into an approximate number in S22 by rounding down or rounding off the travel distance at an arbitrary position. For example, if the travel distance is 36421 km and a process of approximating the number of thousands is performed, an 36000 km is obtained. In addition, 36400 km is obtained when an approximate number is set at the position of 100. If the degree of degradation of the battery can be estimated, the digit of interest to be approximated can be arbitrary. The above example is a kilometer display, but the same applies to a case where the traveling distance is a mile display.

When S22 process is completed, the second battery ID and the battery data are transmitted to the communication device 400 (the control unit 401). The communication device 400 (the control unit 401) transmits the second battery ID and the battery data to the second servers 200.

In S23, the second servers 200 update the battery data 202A based on the received data.

Figure 6:
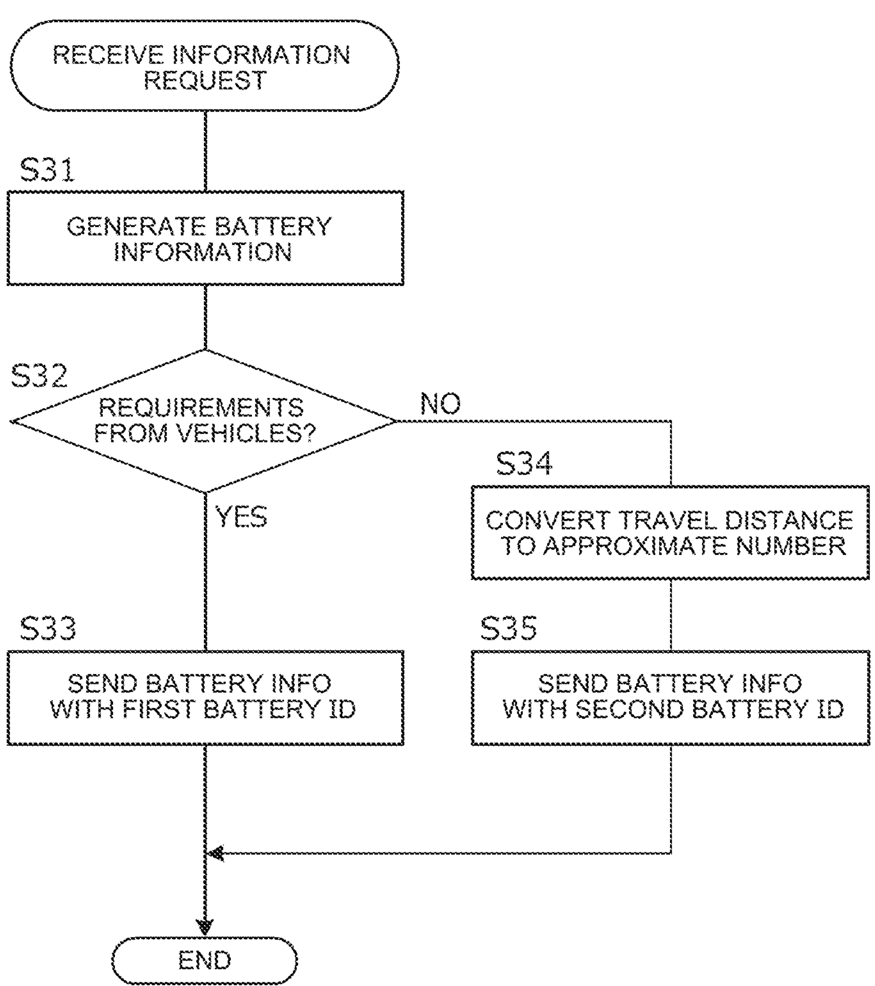
FIG. 6 is a flow chart of a process executed by ECU of the battery pack.

Next, the process performed by the battery pack 500 (ECU 501) in the above-described S13, S21 and S22 will be described. FIG. 6 is a flow chart of a process executed by a battery pack 500 (ECU 501) in S13, S21 and S22.

First, in S31, ECU 501 generates battery data. The battery data may be generated based on status data 502A acquired in advance and stored in the storage unit 502. Next, in S32, ECU 501 determines whether or not the received information-request has been transmitted from the vehicle 300. If the request is transmitted from the vehicle 300, the process transitions to S33. When the information request is not transmitted from the vehicle 300 (that is, when the information request is transmitted from the communication device 400), the process transitions to S34.

In S33, ECU 501 reads the first battery ID and transmits it together with the battery data generated by S31.

In S34, ECU 501 performs a process of converting the travel distance included in the battery information into an approximate number. ECU 501 may be rounded down, rounded down, or rounded up to any number of mileages included in the battery info.

In S35, ECU 501 reads the second battery ID and transmits it together with the battery data generated by S31.

As described above, in the battery management system according to the present embodiment, the battery pack to be managed stores two types of identifiers, an identifier associated with the personal information and an identifier not associated with the personal information. The battery pack determines an identifier to be transmitted together with the battery information according to the communication destination device. This makes it possible to appropriately provide the battery information to both the device (first server 100) that handles the personal information and the device (second server 200) that does not. In particular, for a device that does not handle personal information, it is possible to obtain an effect that the personal information cannot be tracked from the battery information because it provides a battery identifier that is not associated with the personal information. When providing the battery information to the second server 200, the battery pack according to the present embodiment executes a process of converting the travel distance included in the battery information into an approximate number. This makes it difficult to estimate the vehicle on which the target battery pack is mounted.

MODIFIED EXAMPLES

The above-described embodiments are merely examples, and the present disclosure may be appropriately modified and implemented without departing from the scope thereof.

For example, the processes and means described in the present disclosure can be freely combined and implemented as long as no technical contradiction occurs.

Further, in the embodiment, the battery identifier to be outputted is determined based on "whether or not the battery pack 500 is mounted on the vehicle 300" (S32), but the determination may be determined based on the communication destination. For example, the battery identifier to be output may be determined based on whether the device that transmitted the information request is the first server (i.e., the device associated with the vehicle 300) or the second server (the device not associated with the vehicle 300). In the embodiment, the process (S34) of converting the travel distance included in the battery information into an approximate number is executed by the battery pack 500 (ECU 501); however, the process may be performed by the communication device 400. The communication device 400 executes the conversion process before transmitting the battery information received from the battery pack 500 to the second server 200.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. A battery system, comprising:
- a battery including an electronic control unit (ECU) including a processor;
- a storage unit that stores a first battery identifier associated with personal information in another system, and a second battery identifier not associated with personal information in the other system;
- wherein the processor is configured to:
  - receive a request;
  - determine whether the request was received from a vehicle or a communication device other than the vehicle;
  - in response to a determination that the request was received from the vehicle, determine that the battery is mounted in the vehicle;
  - in response to a determination that the requested was received from the communication device, determine that the battery is detached from the vehicle;
  - in response to a determination that the battery is mounted on the vehicle, transmit the first battery identifier together with battery information to a first server configured to communicate with the vehicle, wherein the first identifier is associated with the vehicle;
  - in response to a determination that the battery is detached from the vehicle, transmit the second battery identifier together with the battery information to a second server not configured to communicate with the vehicle, wherein the second identifier is not associated with the vehicle; and
  - convert a value indicated by travel distance information of the vehicle included in the battery information into an approximate value for transmitting the battery information with the second identifier.

2. The battery system according to claim 1, wherein the battery information includes at least one of a charge/discharge count, a State of Health (SoH), and a maximum output of the battery.

3. The battery system according to claim 1, wherein the control unit converts the value indicated by the travel distance information by rounding down or rounding off the value at an arbitrary digit position.

4. The battery system according to claim 1, wherein the battery is removable from the vehicle and reusable for a household storage battery.

5. The battery system according to claim 1, wherein the control unit communicates with the vehicle via a Controller Area Network (CAN) interface.

6. The battery system according to claim 1, wherein the communication device relays communication between the second server and the battery when the battery is detached from the vehicle.

7. The battery system according to claim 1, wherein the first server stores the first battery identifier and an identifier of the vehicle in association with each other.

8. The battery system according to claim 1, wherein the battery information includes a temperature and a current of the battery.

9. The battery system according to claim 1, wherein the control unit generates the battery information based on status data stored in the storage unit in response to receiving the request.

* * * * *